United States Patent
Starr et al.

(10) Patent No.: US 9,668,487 B2
(45) Date of Patent: Jun. 6, 2017

(54) CAKE LEVELER

(75) Inventors: David Starr, Woodridge, IL (US);
Catherine Franczyk, Woodridge, IL (US); Jeffrey Bull, Woodridge, IL (US);
Hugh Melling, Woodridge, IL (US);
Traci Chapple, Woodridge, IL (US);
Jeffrey Chiu, Woodridge, IL (US);
Mason Umholtz, Woodridge, IL (US)

(73) Assignee: WILTON INDUSTRIES INC., Woodridge, IL (US)

( * ) Notice: Subject to any disclaimer, the term of this patent is extended or adjusted under 35 U.S.C. 154(b) by 882 days.

(21) Appl. No.: 12/780,565

(22) Filed: May 14, 2010

(65) Prior Publication Data
US 2010/0293790 A1 Nov. 25, 2010

Related U.S. Application Data

(60) Provisional application No. 61/178,306, filed on May 14, 2009.

(51) Int. Cl.
*A21C 15/04* (2006.01)
*B23D 49/10* (2006.01)
(Continued)

(52) U.S. Cl.
CPC .......... *A21C 15/04* (2013.01); *B23D 49/105* (2013.01); *B23D 51/03* (2013.01); *B23D 51/10* (2013.01);
(Continued)

(58) Field of Classification Search
CPC ......... A21C 15/04; B26B 3/03; B26B 27/002; B26D 1/547; B26D 1/5475; B26D 1/553; B26D 1/5535; B26D 3/006; B26D 3/008; B26D 3/24; B26D 3/245; B26D 7/0006; B23Q 9/0028; B23Q 9/0035; B23D 49/10; B23D 49/105; B23D 49/11; B23D 51/03;
(Continued)

(56) References Cited

U.S. PATENT DOCUMENTS 1,471,214 A * 10/1923 Sieben ........................... 30/510
2,781,806 A * 2/1957 Wilson ........................... 30/511
(Continued)

FOREIGN PATENT DOCUMENTS

FR 986.325 * 7/1951 ........... B26B 27/002

OTHER PUBLICATIONS http://www.agbayproducts.com/pdf/agbay_upgradable.pdf.
(Continued)

*Primary Examiner* — Clark F Dexter
(74) *Attorney, Agent, or Firm* — Foley & Lardner LLP

(57) ABSTRACT

A portioning device is provided for use in cutting or leveling a food product. The portioning device comprises a handle section that is configured to be manipulated by a user, a leg section and a blade. The handle section includes an arm configured to receive a leg, a sleeve configured to slide over a portion of the arm, and an arm connector pivotally coupled to the arm. The leg section is configured to support the portioning device on a surface. The leg section includes a blade holder configured to hold an end of a blade portion, and a leg lock configured to adjustably lock the leg in a position. The blade is configured to cut an object.

19 Claims, 6 Drawing Sheets

(51) Int. Cl.
*B23D 51/03* (2006.01)
*B23D 51/10* (2006.01)
*B23D 51/12* (2006.01)
*B26D 3/24* (2006.01)
*B26B 3/03* (2006.01)
*B26D 7/00* (2006.01)
*B26D 3/00* (2006.01)
*B26D 1/547* (2006.01)
*B26B 27/00* (2006.01)

(52) U.S. Cl.
CPC ............... *B23D 51/12* (2013.01); *B26B 3/03* (2013.01); *B26D 3/24* (2013.01); *B26D 7/0006* (2013.01); *B26B 27/002* (2013.01); *B26D 1/547* (2013.01); *B26D 3/006* (2013.01); *Y10S 83/932* (2013.01); *Y10T 83/0296* (2015.04)

(58) Field of Classification Search
CPC ...... B23D 51/10; B23D 51/12; B23D 51/125; B23D 51/14; Y10S 83/932; Y10T 83/0296
USPC ........... 30/114–117, 506–513, 166.3; 83/874
See application file for complete search history.

(56) References Cited

U.S. PATENT DOCUMENTS

| | | | | | |
|---|---|---|---|---|---|
| 2,910,101 | A | * | 10/1959 | Canfield | 30/506 |
| 2,941,558 | A | * | 6/1960 | Dreier | 30/510 |
| 2,964,844 | A | * | 12/1960 | Steward et al. | 30/116 |
| 3,277,754 | A | * | 10/1966 | Lopez | 83/874 |
| 4,213,241 | A | * | 7/1980 | Haapala | 30/115 |
| 5,461,786 | A | * | 10/1995 | Miller | 30/161 |
| 6,647,848 | B1 | * | 11/2003 | Bruner | 83/651.1 |
| 7,644,501 | B2 | * | 1/2010 | Chao | 30/512 |

OTHER PUBLICATIONS http://www.wilton.com/store/site/product.cfm?id=3E30D67E-475A-BAC0-5792C543763E855E&killnav=1.
http://www.wilton.com/store/site/product.cfm?id=3E30D68E-475A-BAC0-541667EE11BAE82B&killnav=1.
http://www.wilton.com/store/site/product.cfm?id=25041F3E-1E0B-C910-EA7BF6A19B06DAE2&killnav=1.
Country Kitchen SweetArt, Cake Slicer-14", 5 pages, http://www.countrykitchensa.com/catalog/product.aspx?productId=1702, Apr. 2010.

* cited by examiner

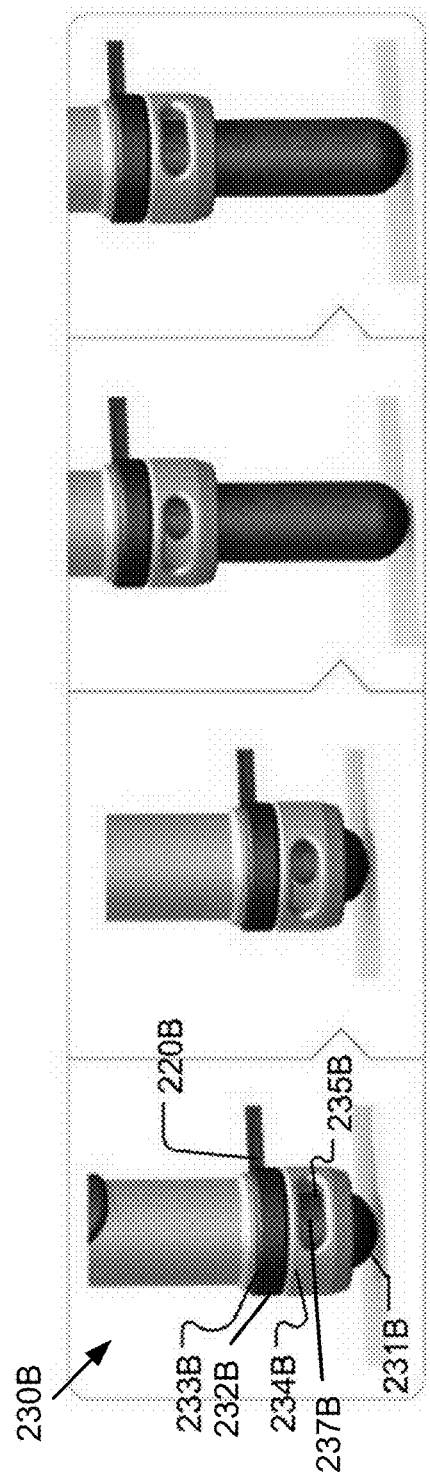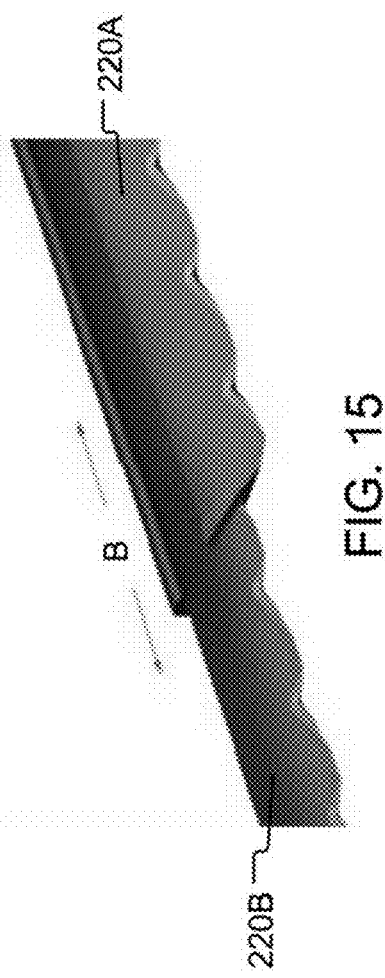

CAKE LEVELER

CROSS REFERENCE TO PRIOR APPLICATIONS

This application claims priority and the benefit thereof from U.S. Provisional Application No. 61/178,306, filed on May 14, 2009, and entitled CAKE LEVELER, the entirety of which is hereby incorporated herein by reference.

BACKGROUND OF THE DISCLOSURE

1. Field of the Disclosure

The present disclosure relates to a portioning device for portioning an object, such as, for example, a cake, a loaf, or other food product, or non-food objects that lend themselves to implementation of the portioning device.

2. Related Art

A number of devices are currently available for cutting cake tops or layers. For example, FIGS. 1-4 show four different examples of devices for cutting cake tops or layers. In particular, FIGS. 1-2 show examples of cake levelers available from Wilton at <www.wilton.com>; FIG. 3 shows an example of a cake leveler available from Agway Products; and FIG. 4 shows an example of a serrated kitchen knife that may be used for cutting cakes. While adequate for their intended purpose, these currently available devices can be impractical to store, or the devices may not provide a precise, controlled cut during use, depending on the particular device used.

A portioning device is provided herein, which is adjustable in size, thereby facilitating implementation across a wider spectrum of cake sizes, while providing for a compact design that facilitates easy and efficient storage.

SUMMARY OF THE DISCLOSURE

According to an aspect of the disclosure, a portioning device is disclosed, which may be used for cutting or leveling a food product. The portioning device comprises a handle section that is configured to be manipulated by a user, the handle section including: an arm configured to receive a leg; a sleeve configured to slide over a portion of the arm; and an arm connector pivotally coupled to the arm. The portioning device further comprises a leg section configured to support the portioning device on a surface, the leg section including: a blade holder configured to hold an end of a blade portion; and a leg lock configured to adjustably lock the leg in a position. The portioning device also comprises a blade configured to cut an object such as the food product. The leg lock may comprise an opening configured to make visible a marking on the leg. The blade may comprise two blade portions, the two blade portions being pivotally coupled to each other. The arm connector may comprise: an actuator configured to release the sleeve to enable the sleeve to slide over the portion of the arm; or a locking portion configured to engage and lock the arm in position.

The portioning device may further comprise: a leg configured to be inserted into one end of the arm, the leg including a marking section; a second arm configured to be pivotally coupled to the arm connector, wherein a longitudinal axis of the second arm is substantially parallel to and offset from a longitudinal axis of said arm when the device is arranged in a collapsed configuration; or an actuator configured to release the sleeve to enable the sleeve to slide over the portion of said arm. The sleeve may comprise an opening for receiving the actuator.

According to further aspect of the disclosure, a portioning device is disclosed, comprising: a handle section that is configured to be manipulated by a user; and a blade that is configured to cut an object, wherein the handle section and the blade are collapsible. The handle section may comprise: an arm configured to receive a leg; and a sleeve configured to slide over a portion of the arm. The handle section may further comprise an arm connector pivotally coupled to the arm. The blade may comprise two blade portions pivotally coupled to each other.

The portioning device may further comprise a leg section that is configured to support the device on a surface. The leg section may comprise: a blade holder configured to hold an end of a blade portion; and a leg lock configured to adjustably lock a leg in a position. The leg lock may further comprise an opening configured to make visible a marking on the leg.

The portioning device may further comprise: a second arm configured to be pivotally coupled to the arm connector, wherein a longitudinal axis of the second arm is substantially parallel to and offset from a longitudinal axis of said arm when the device is arranged in a collapsed configuration; or an actuator configured to release a sleeve to enable the sleeve to slide over a portion of said arm. The sleeve may comprise an opening for receiving the actuator.

According to further aspect of the disclosure, a portioning device is disclosed, which may be used for cutting or leveling a food product. The device comprises: a handle section configured to be manipulated by a user; a blade configured to cut an object; and a leg section configured to support the device on a surface, wherein the handle section and the blade are collapsible, and wherein the leg section is retractable. The handle section may comprise a sleeve, which is configured to: lock and hold the device in an expanded configuration when located in a first position; and allow the device to be collapsed when located in a second position.

Additional features, advantages, and embodiments of the disclosure may be set forth or apparent from consideration of the following detailed description and drawings. Moreover, it is to be understood that both the foregoing summary of the disclosure, the following detailed description and drawings are exemplary and intended to provide further explanation without limiting the scope of the disclosure.

BRIEF DESCRIPTION OF THE EXHIBITS

The accompanying attachments, including drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced. In the exhibits:

FIGS. 11-14 show examples of various stages of operation and extension of a leg section of the portioning device of FIG. 8, according to principles of the disclosure; and FIG. 15 shows a partial detailed view of an example of a blade section of the portioning device of FIG. 8, according to principles of the disclosure.

Figure 1:
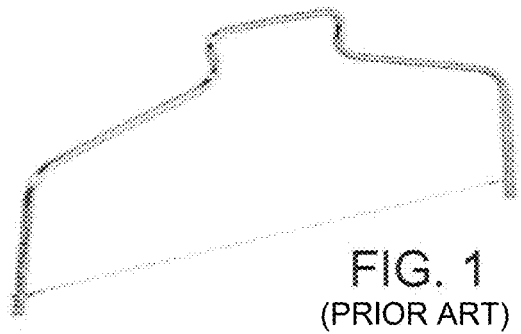
FIGS. 1-4 show examples of various existing cake cutting devices.
Figure 2:
Figure 3:
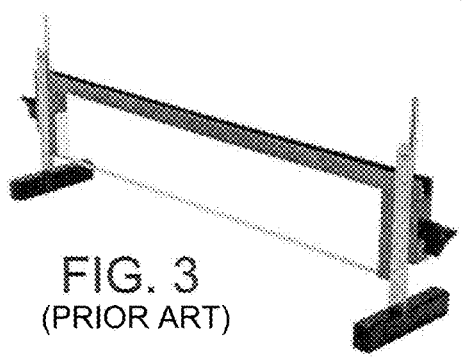
Figure 4:

The present disclosure is further described in the detailed description that follows.

DETAILED DESCRIPTION OF THE DISCLOSURE

The embodiments of the disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure, which is defined solely by the appended claims and applicable law. Moreover, it is noted that like reference numerals represent similar parts throughout the several views of the drawings.

The terms "including", "comprising" and variations thereof, as used in this disclosure, mean "including, but not limited to", unless expressly specified otherwise.

The terms "a", "an", and "the", as used in this disclosure, means "one or more", unless expressly specified otherwise.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

Figure 5:
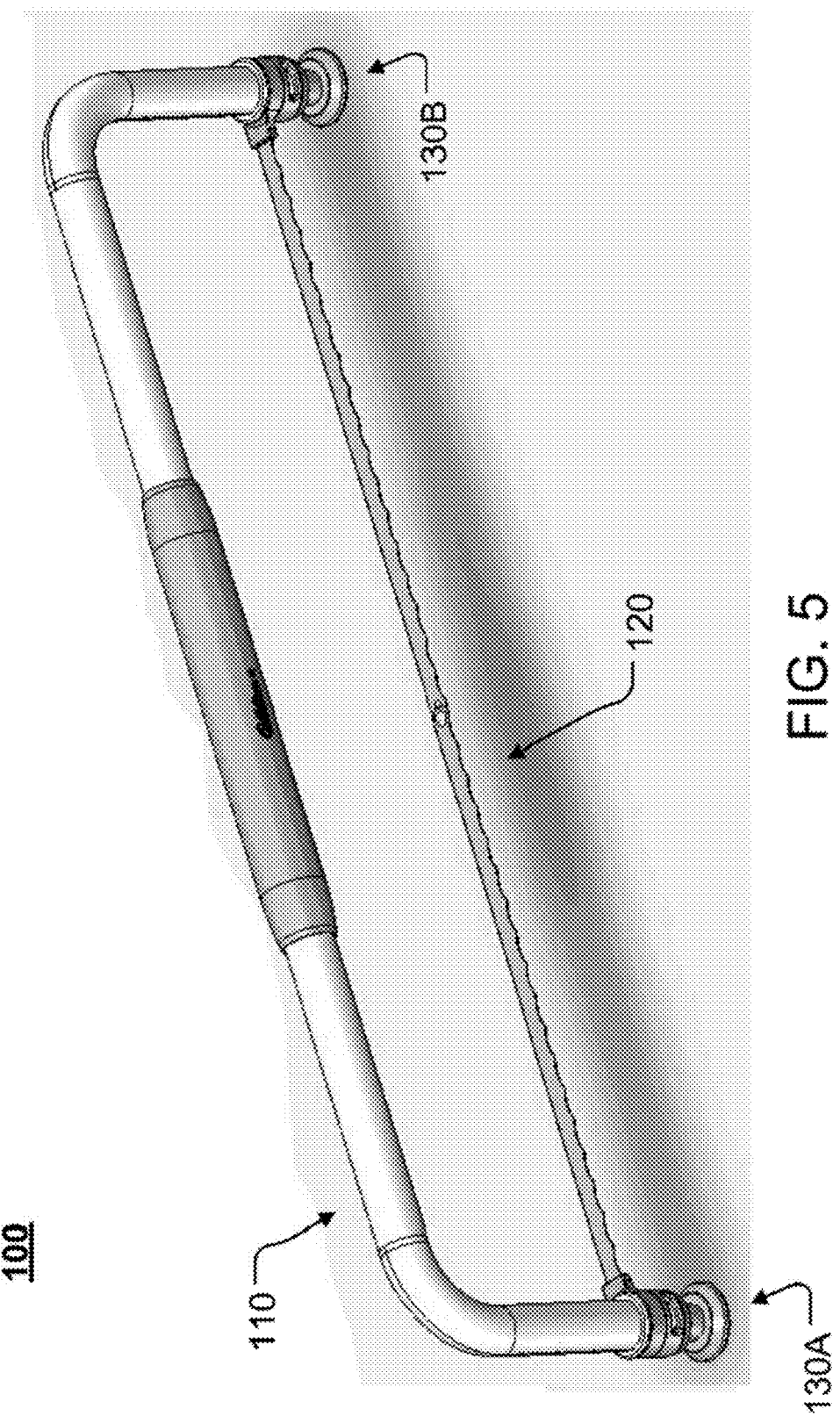
FIG. 5 shows a perspective view of an example of a portioning device in an expanded configuration, according to principles of the disclosure.

FIG. 5 shows a perspective view of an example of a portioning device 100 in an expanded configuration. The portioning device 100 includes a handle section 110, a blade 120 and a pair of leg sections 130A, 130B. In the expanded configuration, the portioning device 100 may be adjusted and used to cut or level, for example, cakes, loafs, or the like, or non-food products, having various heights and/or widths, as will be readily apparent to those having ordinary skill in the art, without departing from the scope or spirit of the disclosure. The portioning device 100 is configured to be adjustable in height and width, thereby providing for a collapsed (or folded) configuration that facilitates easy and efficient storage while not in use, or an expanded, height-adjustable configuration for use with, for example, cakes having various sizes and shapes.

Figure 6:
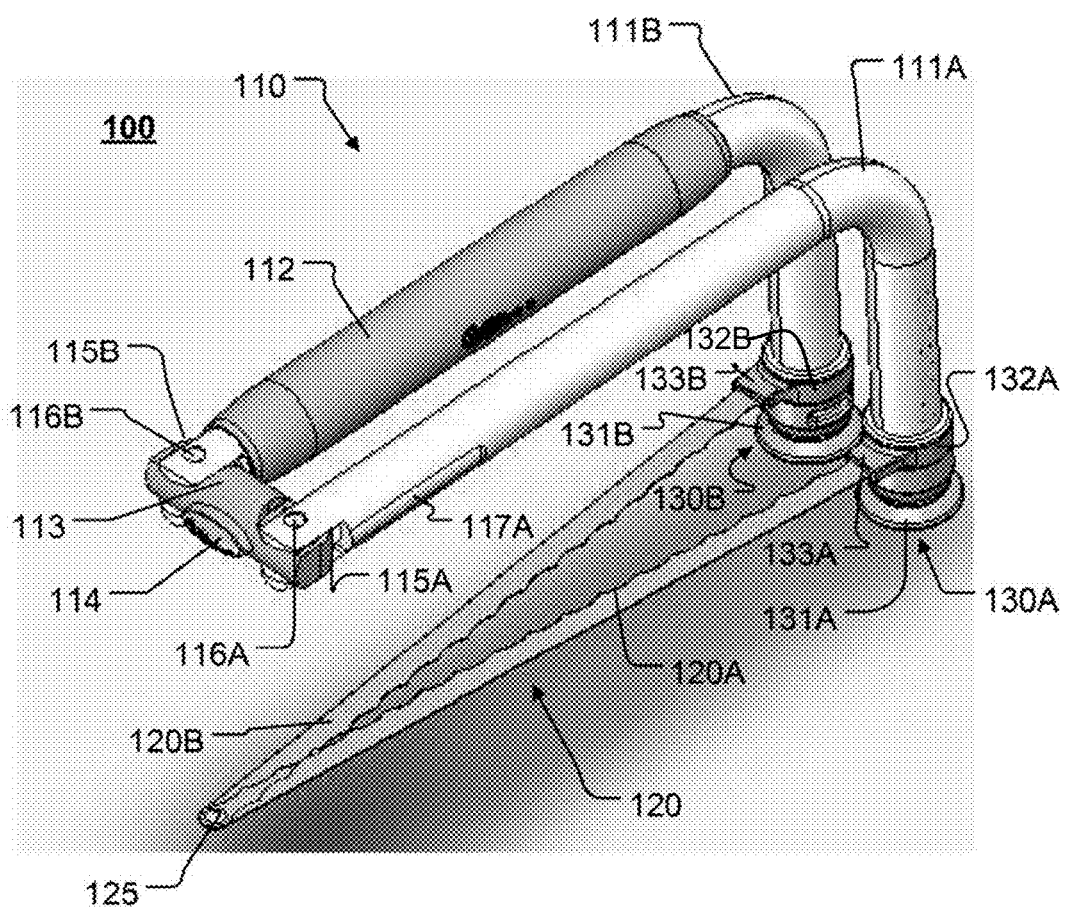
FIG. 6 shows a perspective view of the portioning device of FIG. 5 in a collapsed (or folded) configuration, according to principles of the disclosure.

FIG. 6 shows a perspective view of the portioning device 100 in a collapsed (or folded) configuration, according to principles of the disclosure. In the collapsed configuration, the portioning device 100 may be collapsed (or folded) to about half of its total width compared to its width in the expanded configuration (shown in FIG. 5). Furthermore, a pair of legs 131A, 131B may be fully retracted into respective arms 111A, 111B, for maximum compaction, thereby facilitating easy and efficient storage of the portioning device 100.

As seen in FIG. 6, the handle section 110 may include the pair of arms 111A, 111B, a sleeve 112, and an arm connector 113. The sleeve 112 may be configured to slide along the length of either one of the arms 111A, 111B, exposing the connector 113, as shown in FIG. 6. The sleeve 112 may be further configured to lock and hold the portioning device 100 in the expanded configuration when located in a position (for example, shown in FIG. 5), and to release and allow the portioning device 100 to be collapsed when located in another position (for example, shown in FIG. 6). Each of the arms 111A, 111B may have, for example, an L-shape, an arch shape, or any other shape, as understood by those having ordinary skill in the art. The arms 111A, 111B may be open at one end to receive and hold the respective leg 131A, 131B. At the opposite ends, the arms 111A, 111B may be pivotally attached to the arm connector 113, for example, by a respective pivot 116A, 116B. One or both of the arms 111A, 111B may include a protrusion (or bump) 117A. The protrusion 117A may be configured, for example, to engage the sleeve 112 and keep the sleeve 112 from rotating as it slides back and forth along the longitudinal axis, thereby ensuring that an actuator 114 slides into the receiving opening in the sleeve 112.

The arm connector 113 may include the actuator 114 and a pair of locking portions 115A, 115B. The arm connector 113 may further include, for example, a spring mechanism (not shown). The spring mechanism may be configured to exert a force on the actuator 114 to maintain the actuator in an outward, protruding depressible position (shown in FIG. 6).

The sleeve 112 may include an opening (not shown) for lockably receiving the actuator 114, such that the actuator 114 pops-out through the opening when the portioning device 100 is unfolded into the expanded configuration and the sleeve 112 is slid to the locking position (shown in FIG. 5). To unlock the sleeve 112, a user may simply depress the actuator 114, using, for example, a thumb, and slide the sleeve 112 to one side, over one of the arms 111A, 111B, thereby exposing the arm connector 114.

The blade 120 may include blade portions 120A, 120B, which may have substantially equal lengths. The blade 120 may include, for example, one or more serrated edges, one or more smooth edges, an elongated substantially planar structure (for example, as shown in FIG. 5), a wire, or the like. The blade portions 120A, 120B may be pivotally attached to each other at a pivot point 125 at one of their ends, and to respective leg sections 130A, 130B at the other ends. In particular, the blade portions 120A, 120B may be attached to rings 132A, 132B of the leg sections 130A, 130B, respectively. The rings 132A, 13B may include blade holders 133A, 133B, which are configured to receive and hold the blade portions 120A, 120B. The blade holders 133A, 133B may include a quick release mechanism (not shown) for releasing the blade portions 120A, 120B for quick and easy replacement of the blade 120.

Figure 7:
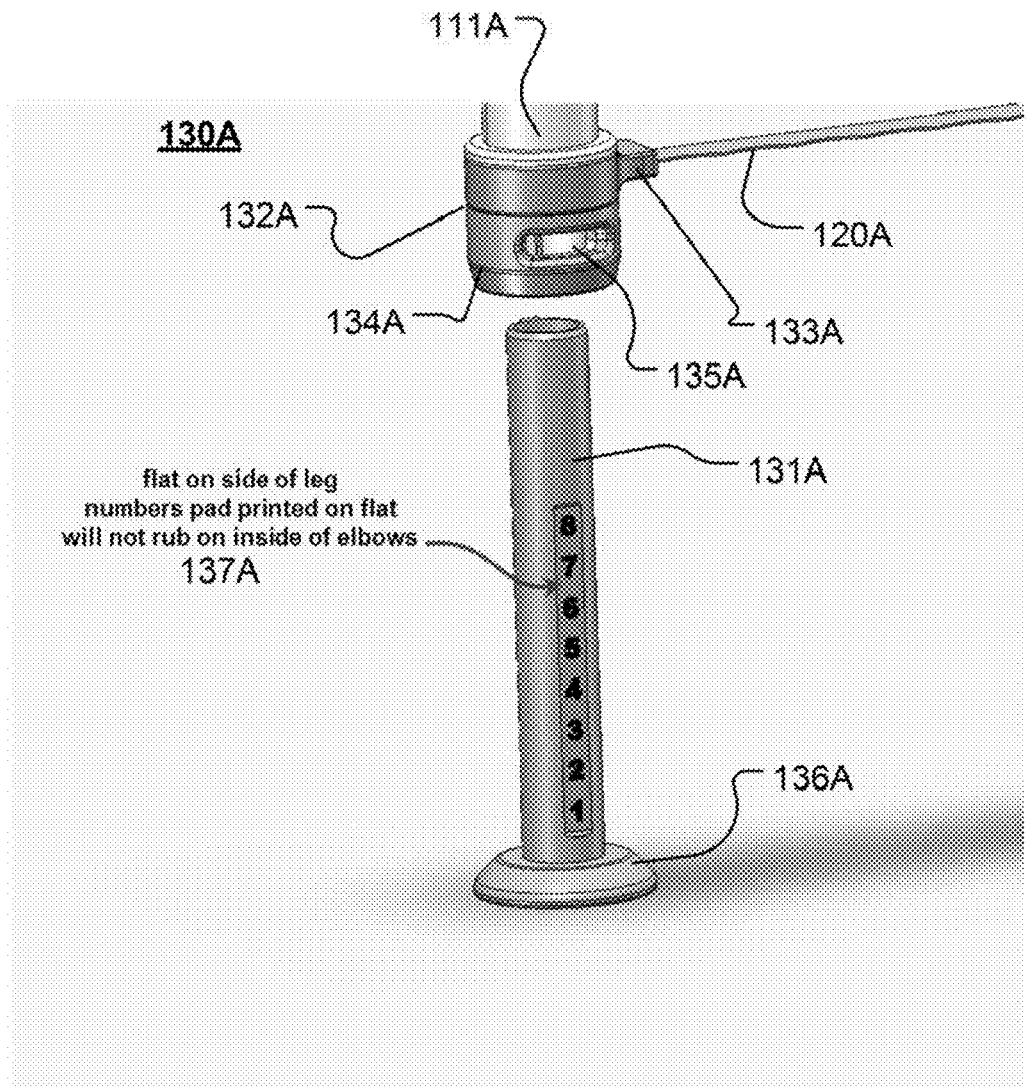
FIG. 7 shows a detailed view of a leg section of the portioning device of FIG. 5, according to principles of the disclosure.

FIG. 7 shows a detailed view of an example of the leg section 130A that may be employed in the portioning device 100, according to principles of the disclosure. It is noted that the leg section 130B may have the same (or different) components as described herein with regard to the leg section 130A. The leg section 130A may include the ring 132A and the leg 131A. The ring 132A may include the blade holder 133A and a leg lock 134A. The leg lock 134A may include an opening 135A through which a markings portion 137A of the leg 131A may be visible. The leg 131A may include a base 136A and the markings portion 137A. The markings portion 137A may include, for example, a flattened portion with printed, inscribed, or otherwise marked notations (such as, for example, numbers 1 through 8, shown in FIG. 7). The leg lock 134A is configured to receive the leg 131A and allow the leg 131A to be adjustably inserted into the arm 111A through the leg lock 134A. The leg lock 134A may be further configured to be rotated, for example, by hand to lock or unlock the leg 131A in position with regard to the ring 132A.

It is noted that the arms 111A, 111B, the blade 120 and/or the legs 131A, 131B may include telescopic configurations. In this regard, the arms 111A, 111B, the blade 120 and/or the legs 131A, 131B may be further configured to expand or contract along the longitudinal axis of the arms 111A, 111B, the blade 120 and/or the legs 131A, 131B, respectively, as understood by those having ordinary skill in the art, without departing from the spirit or scope of the disclosure.

Referring to FIGS. 5-7, starting from the expanded configuration shown in FIG. 5, a user may collapse and store the portioning device 100 by, for example, depressing the actuator 114 (if implemented) to release the sleeve 112, and sliding the sleeve to one side over the arm 111A or 111B. The user may then fold the arms 111A, 111B, folding the portioning device 100 into the collapsed configuration shown in FIG. 6. In the collapsed configuration, the longitudinal axis of the arm 111A is substantially parallel to and offset from the longitudinal axis of the arm 111B. The user may retract the legs 131A, 131B before (or after) folding the portioning device 100 by releasing the leg locks 134A, 134B and pushing the legs 131A, 131B into the arms 111A, 111B. To reconfigure the portioning device 100 from the collapsed configuration (shown in FIG. 6) to the expanded configuration (shown in FIG. 5), a user would perform the reverse of the foregoing steps, except that the user may not need to depress the actuator 114.

The portioning device 100 may be used, for example, by a cake baker, a cake decorator, or the like, to cut off, for example, a crown of a cake, thereby providing an even top surface for torting (or slicing off layers), filling with icing, stacking, and the like.

Figure 8:
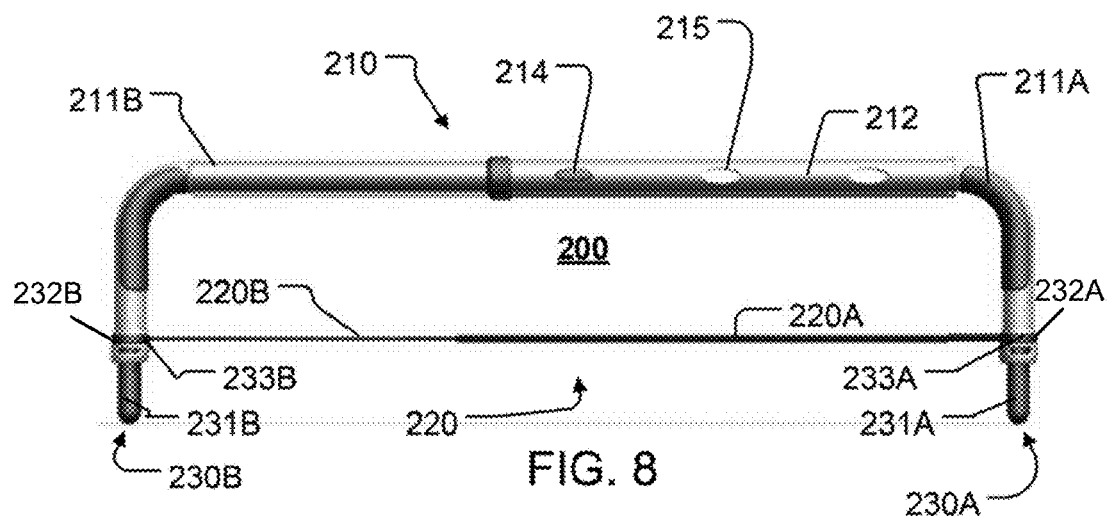
FIG. 8 shows another example of a portioning device in an expanded configuration, according to principles of the disclosure.

FIG. 8 shows an example of a portioning device 200 in an expanded configuration, according to principles of the disclosure. The portioning device 200 includes a handle section 210, a blade 220 and a pair of leg sections 230A, 230B. In the expanded configuration, the portioning device 200 may be adjusted and used to cut or level, for example, cakes, loafs, or the like, or non-food products, having various heights and/or widths, as will be readily apparent to those having ordinary skill in the art, without departing from the scope or spirit of the disclosure. The portioning device 200 is configured to be adjustable in height and width, thereby providing for a collapsed (or retracted) configuration that facilitates easy and efficient storage while not in use, or an expanded, height-adjustable configuration for use with, for example, cakes having various sizes and shapes.

Figure 9:
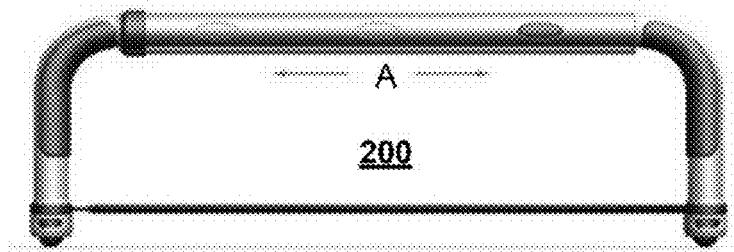
FIG. 9 shows the portioning device of FIG. 8 in a collapsed (or retracted) configuration, according to principles of the disclosure.

FIG. 9 shows the portioning device 200 in a collapsed (or retracted) configuration, according to principles of the disclosure. As seen, the portioning device 200 is configured to collapse (or expand) along a longitudinal axis A. In the collapsed configuration, the portioning device 200 may be collapsed (or retracted) to a width that is substantially smaller than the width of the portioning device 200 in the expanded configuration (shown in FIG. 8). Furthermore, a pair of legs 231A, 231B may be fully retracted into the respective arms 211A, 211B, for maximum compaction, thereby facilitating easy and efficient storage of the portioning device 200.

As seen in FIG. 8, the handle section 210 may include a pair of arms 211A, 211B, and a sleeve 212. The sleeve 212 may be integrally formed with, or attached to the arm 211A. The sleeve 212 is configured to telescopically receive a portion of the arm 211B, such that the portion of the arm 211B may slide into the sleeve 212. Each of the arms 211A, 211B may have, for example, an L-shape, an arch shape, or any other shape, as understood by those having ordinary skill in the art. The arms 211A, 211B may be open at one end to receive and hold a respective leg 231A, 231B. At the opposite end, the arm 211A (including the sleeve 212) is configured to telescopically receive the arm 211B.

Figure 10:
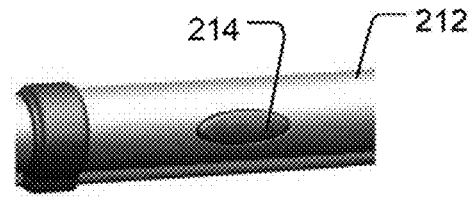
FIG. 10 shows a detailed view of an example of a latch on a handle section of the portioning device of FIG. 8, according to principles of the disclosure.

FIG. 10 shows a detailed view of the sleeve 212 and actuator 214. The arm 211B may include the actuator 214 and a spring mechanism (not shown). The spring mechanism may be configured to exert a force on the actuator 214 to maintain the actuator 214 in an outward, protruding depressible position (shown in FIG. 8). The arm 211A may include one or more openings 215 for lockably receiving the actuator 214. While the arm 211A is shown to include three openings 215 for three adjustable locking positions between the arms 211A, 211B, it is noted that any number of openings 215 may be included in the arm 211A, without departing from the scope or spirit of the disclosure.

The blade 220 may include blade portions 220A, 220B, which may have substantially equal lengths, or different lengths. The blade 220 may include, for example, one or more serrated edges, one or more smooth edges, an elongated substantially planar structure, a wire, a cylinder, or the like. The blade portions 220A, 220B may be slidably attached to each other, as shown in greater detail in FIG. 15. For example, FIG. 15 shows a detailed view of a connection area between the blade portions 220A, 220B, which are configured to move with respect to each other along a longitudinal axis B. The longitudinal axis B may be substantially parallel to the axis A, shown in FIG. 9. In particular, the blade portion 220B is configured to slide, for example, within a cavity or channel in the blade portion 220A.

The blade portions 220A, 220B may be attached to rings 232A, 232B of the leg sections 230A, 230B, respectively. The rings 232A, 232B may include blade holders 233A, 233B, which are configured to receive and hold the blade portions 220A, 220B. The blade holders 233A, 233B may include a quick release mechanism (not shown) for releasing the blade portions 220A, 220B for quick and easy replacement of the blade 220.

FIGS. 11-14 show examples of various stages of operation and extension of the leg section 230B that may be employed in the portioning device 200. It is noted that the leg section 230A may have the same (or different) components as described herein with regard to the leg section 230B. The leg section 230B may include the ring 232B and the leg 231B. The ring 232B may include the blade holder 233B and a leg lock 234B. The leg lock 234B may include an opening 235B through which a markings portion (not shown) of the leg 231B may be visible. The markings portion 237B may include, for example, a flattened portion with printed, inscribed, or otherwise marked notations (such as, for example, numbers 1 through 8, shown in FIG. 7). The leg lock 234B is configured to receive the leg 231B and allow the leg 231B to be adjustably slid into the arm 211B through the leg lock 234B. The leg lock 234B may be further configured to be rotated, for example, by hand to lock or unlock the leg 231B in position with regard to the ring 232B.

According to aspects of the disclosure, the portioning device 100 (or 200) may be adjusted in width and/or height, so as to allow for customized cutting of, for example, cakes. As seen in FIGS. 5-15, the portioning device 100 (or 200) may be expanded or contracted horizontally and/or vertically. Further, the blade of the portioning device 200 (or 100) may be expanded or contracted longitudinally, as seen in the figures. Still further, the legs, or portions thereof, may be extended or retracted to raise or lower the portioning device cutting height. The legs may include, for example, twistable leg locks (or lockable portions) to secure the legs at various degrees of height (or length) as seen in the Figures. The portioning device 100 (or 200) may include, for example, plastics, metals, glass, or the like.

While the invention has been described in terms of exemplary embodiments, those skilled in the art will recognize that the invention can be practiced with modifications in the spirit and scope of the appended claims. These examples given above are merely illustrative and are not meant to be an exhaustive list of all possible designs, embodiments, applications or modifications of the invention.

What is claimed:

1. A portioning device for cutting or leveling a food product, comprising:
    a blade configured to cut the food product, the blade including a pivot structure at a central portion thereof;
    a first leg section and a second leg section configured to support the portioning device on a surface, each of the first and second leg sections including:
        a leg;
        a blade holder connected with the blade; and
        a leg lock operatively mounted to the leg and configured to selectively lock the leg in a position at a selected height of the leg; and
    a handle section configured to be manipulated by a user, the handle section including:
        a first arm that is mounted to the first leg section;
        a second arm that is mounted to the second leg section;
        a sleeve slidable over a portion of each of the first and second arms; and
        an arm connector pivotally coupled at a first end thereof to the first arm and pivotally coupled at a second end thereof to the second arm such that the handle section is foldable about a central portion thereof;
    wherein the leg of the first leg section is telescopically extendable and retractable relative to the first arm and the leg of the second leg section is telescopically extendable and retractable relative to the second arm to adjust the height of each leg so as to adjust a distance between the blade and the surface, and
    wherein the handle section is foldable about the central portion thereof and the blade is foldable about the central portion thereof to place the device in a collapsed configuration.

2. The device according to claim 1, wherein each leg lock comprises an opening configured to make visible a marking on the leg of its respective leg section.

3. The device according to claim 1, wherein a longitudinal axis of one of the first and second arms is substantially parallel to and offset from a longitudinal axis of the other of the first and second arms when the device is arranged in the collapsed configuration.

4. The device according to claim 1, further comprising:
    an actuator configured to release the sleeve to enable the sleeve to slide over the portion of each of the first and second arms.

5. The device according to claim 4, wherein the sleeve comprises an opening for receiving the actuator.

6. The device according to claim 1, wherein the arm connector comprises:
    an actuator configured to release the sleeve to enable the sleeve to slide over the portion of each of the first and second arms.

7. The device according to claim 1, wherein the arm connector comprises:
    a locking portion configured to engage and lock each of the first and second arms in position.

8. The device according to claim 1, wherein each leg includes a marking section having a marked notation.

9. The portioning device of claim 1,
    wherein the blade holder of the first leg section is part of a first ring, the first ring being disposed about the first arm, and the leg lock of the first leg section is part of the first ring and is disposed adjacent to an end of the first arm,
    wherein the blade holder of the second leg section is part of a second ring, the second ring being disposed about the second arm, and the leg lock of the second leg section is part of the second ring and is disposed adjacent to an end of the second arm,
    wherein the leg of the first leg section is partially disposable within the first arm, and
    wherein the leg of the second leg section is partially disposable within the second arm.

10. The portioning device of claim 9, wherein the blade is disposed between the first and second arms.

11. The device according to claim 1, wherein each leg is telescopically extendable and retractable relative to the respective one of the first and second arms in a direction perpendicular to a longitudinal axis of the blade.

12. The device according to claim 1, wherein each leg includes a flat base configured to support the device on the surface.

13. The device according to claim 1,
    wherein the first leg section further includes a first ring, the blade holder and the leg lock of the first leg section being part of the first ring, the blade holder of the first leg section being disposed between the leg lock of the first leg section and a portion of the first arm, and
    wherein the second leg section further includes a second ring, the blade holder and the leg lock of the second leg section being part of the second ring, the blade holder of the second leg section being disposed between the leg lock of the second leg section and a portion of the second arm.

14. The device according to claim 1, wherein each leg lock is configured to be rotated to lock or unlock the respective leg of the first leg section and the second leg section in a position at the selected height of the respective leg of the first leg section and the second leg section.

15. A portioning device for cutting or leveling a food product, the device comprising:
   a handle section configured to be manipulated by a user, the handle section including a pivot structure at a central portion thereof;
   a blade mounted to the handle section and configured to cut the food product, the blade having a pivot structure at a central portion thereof; and
   two legs mounted to the handle section and configured to support the device on a surface, each leg being telescopically extendable and retractable relative to the handle section to alter a height of each leg so as to alter a distance of the blade from the surface,
   wherein the handle section is foldable about its central portion and the blade is foldable about its central portion to place the device in a collapsed configuration.

16. The device according to claim 15, wherein the handle section comprises a sleeve that is movably mounted to a portion of the handle section and that is movable relative to the pivot structure of the handle section, the sleeve being configured to:
   lock and hold the device in an expanded configuration when located in a first position, and
   allow the device to be collapsed to the collapsed configuration when located in a second position,
   wherein in both the expanded configuration and the collapsed configuration, the handle section, the blade and the legs remain connected.

17. The device according to claim 15, wherein each leg is telescopically extendable and retractable in a direction perpendicular to a longitudinal axis of the blade.

18. The device according to claim 15, wherein each leg is part of a leg section, and each leg section further includes a ring mounted to the handle section, and wherein each ring includes:
   a blade holder connected with the blade; and
   a leg lock configured to adjustably lock the respective leg at a selected said height of the leg so as to fix the distance of the blade from the surface.

19. The device according to claim 15, wherein each leg includes a flat base configured to support the device on the surface.

* * * * *